United States Patent [19]

Greenstein

[11] Patent Number: 4,718,766
[45] Date of Patent: Jan. 12, 1988

[54] STABILIZED RING LASER BIAS SYSTEM

[76] Inventor: Howard B. Greenstein, P.O. Box 993, Palo Alto, Calif. 94302

[21] Appl. No.: 698,509

[22] Filed: Feb. 5, 1985

[51] Int. Cl.$^4$ .................................................. G01C 19/64
[52] U.S. Cl. .................................................. 356/350
[58] Field of Search ........................ 356/350; 372/94

[56] References Cited

U.S. PATENT DOCUMENTS

| | | | |
|---|---|---|---|
| 3,373,650 | 3/1968 | Killpatrick | 356/350 |
| 3,807,866 | 4/1972 | Zingery | 356/350 |
| 3,862,803 | 9/1968 | Yntema et al. | 356/350 |
| 3,879,130 | 4/1975 | Greenstein | 356/350 |
| 4,006,989 | 12/1974 | Andringa | 356/350 |
| 4,305,046 | 12/1981 | Le Floch et al. | 356/350 X |
| 4,415,266 | 11/1983 | Matthews et al. | 356/350 |

*Primary Examiner*—Davis L. Willis
*Assistant Examiner*—S. A. Turner
*Attorney, Agent, or Firm*—Townsend & Townsend

[57] ABSTRACT

In a ring laser with an intracavity saturable absorber and a birefringent cavity, a bias is established whose frequency is less than the axial mode spacing. Bias drift may be nulled on the basis of bias error signals obtainable directly from the output beams. In a first embodiment the plurality of birefrigent elements comprises a waveplate and a rotator, and the optical property measured to derive the bias error signal is the state of polarization of either output beam. In a second embodiment the plurality of birefringent elements comprises two misaligned waveplates that are nominally half-waveplates. In the second embodiment, the bias error signal may be derived by two techinques. The first technique is based on polarization. Cavity birefringence is modulated in a prescribed way; the signal generated by polarization-detection apparatus contains modulated components, which are then demodulated to provide the desired bias error signal. The second technique is based on frequency. Cavity birefringence is altered by means of a sequence of pulsed interrogation signals, and a difference frequency measurement is made for each step of the sequence to obtain a bias error signal.

68 Claims, 13 Drawing Figures

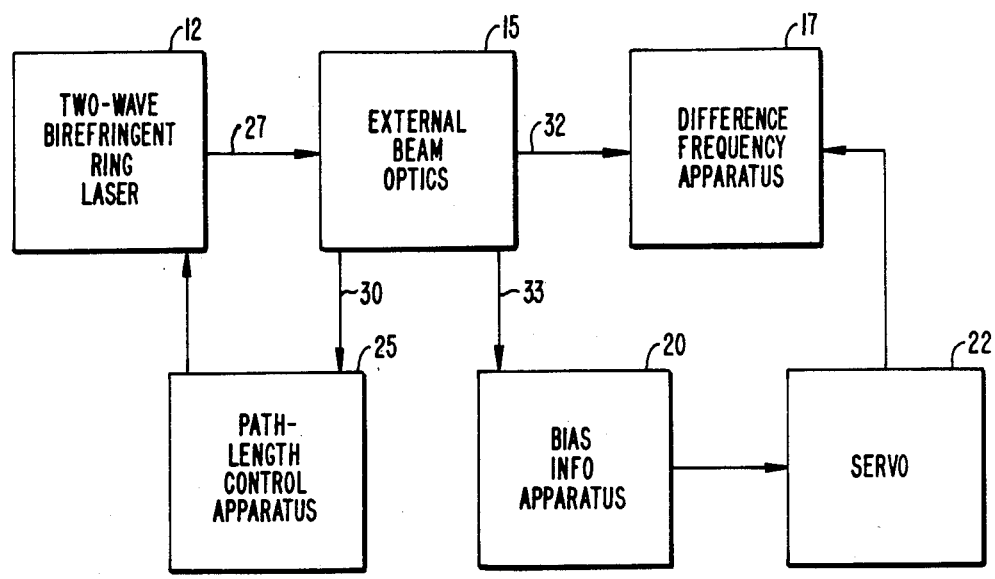
FIG._1A.
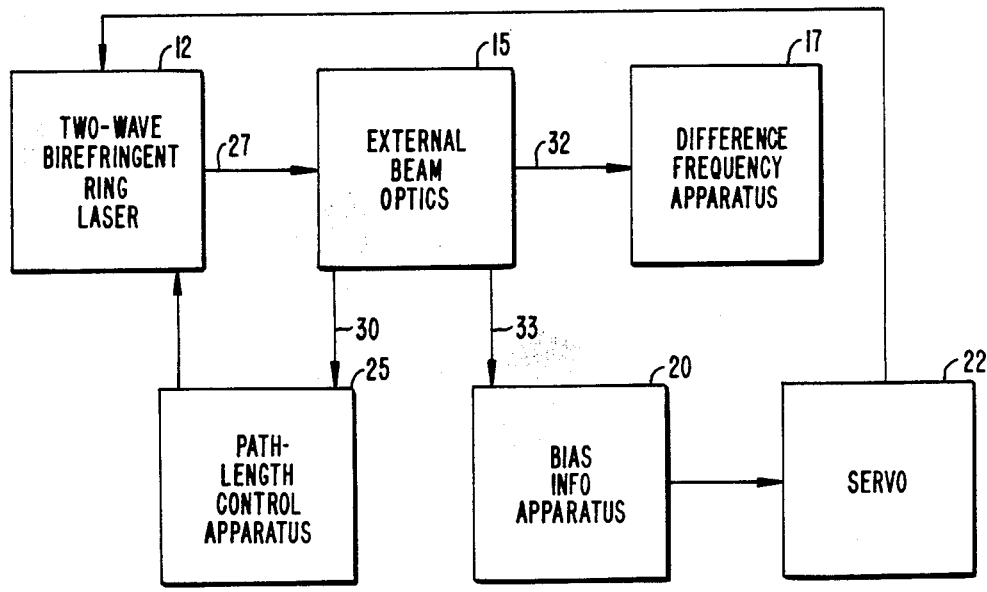
FIG._1B.

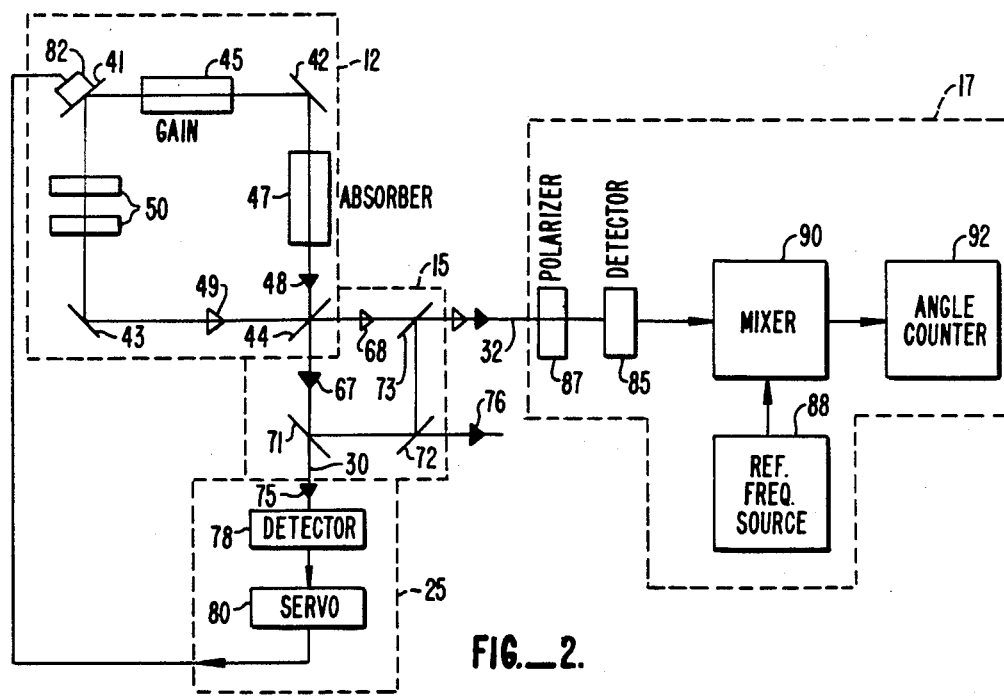
FIG._2.
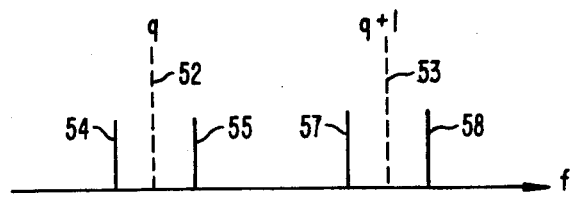
FIG._3.
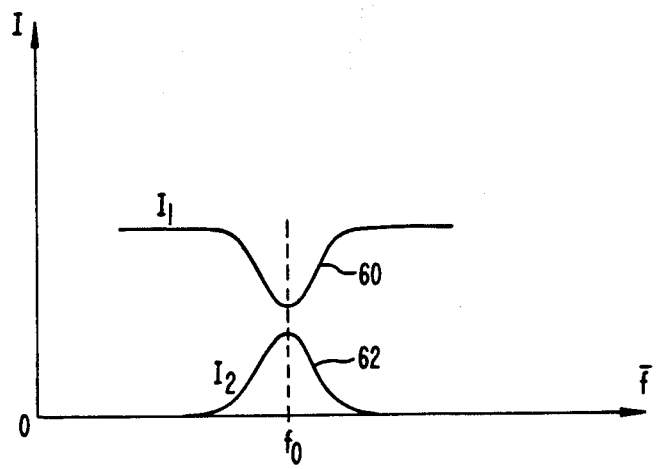
FIG._4.

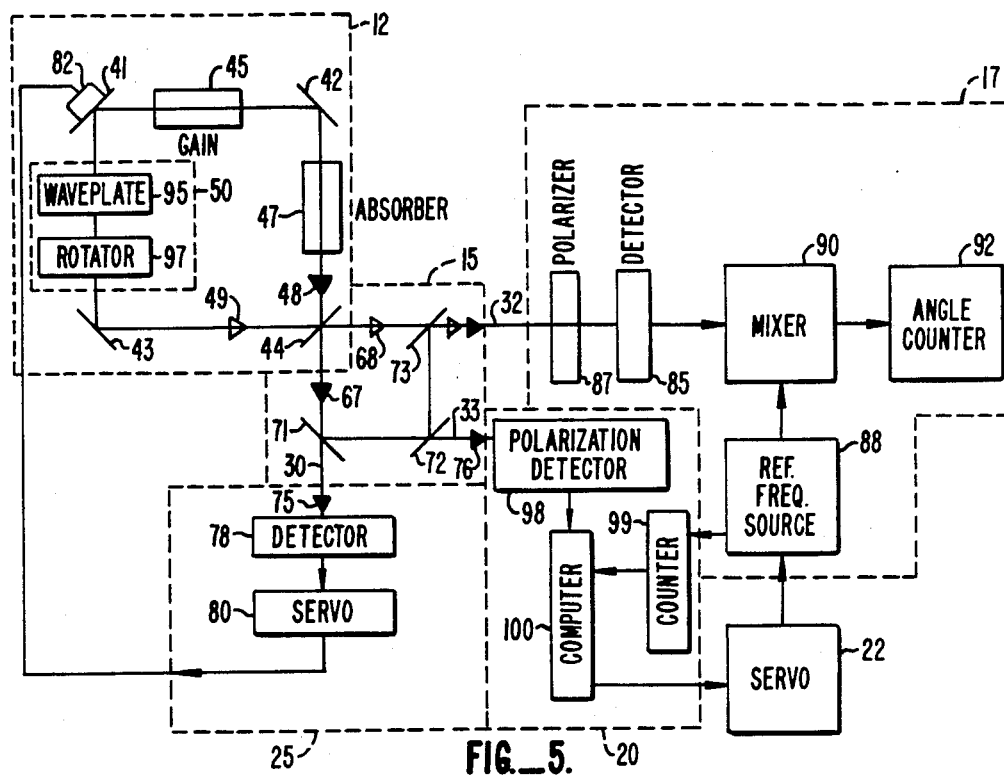
FIG._5.
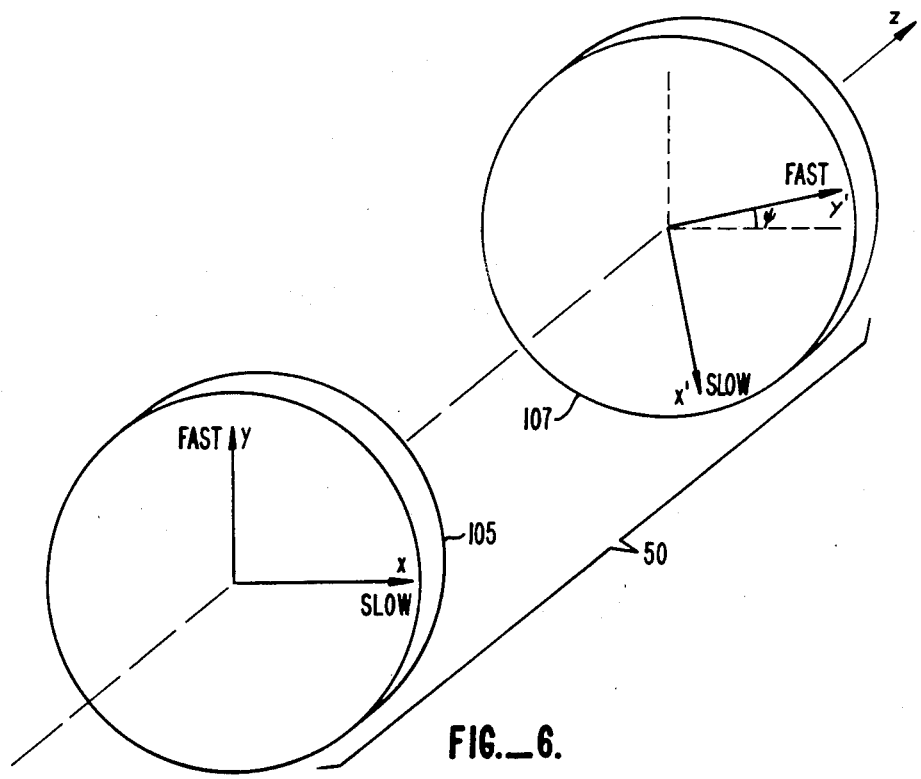
FIG._6.

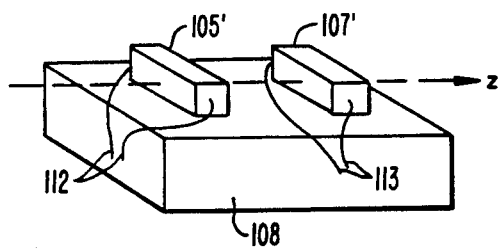
FIG._7A.
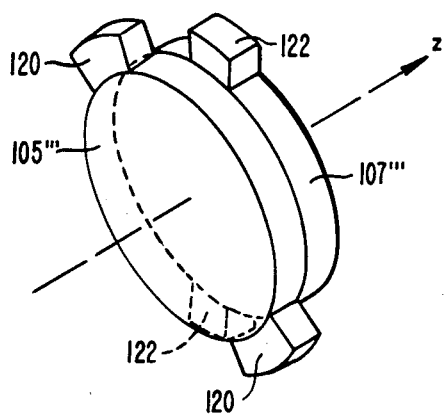
FIG._7C.
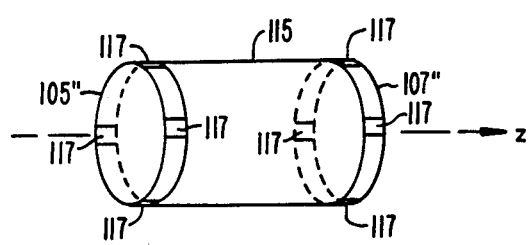
FIG._7B.
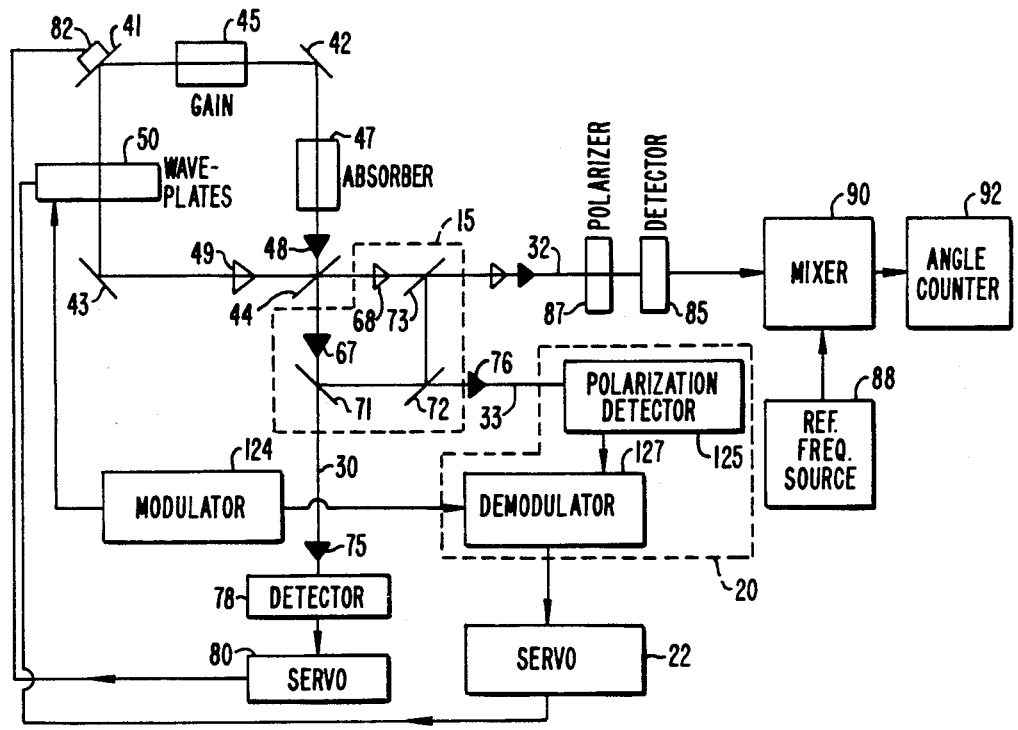
FIG._8.

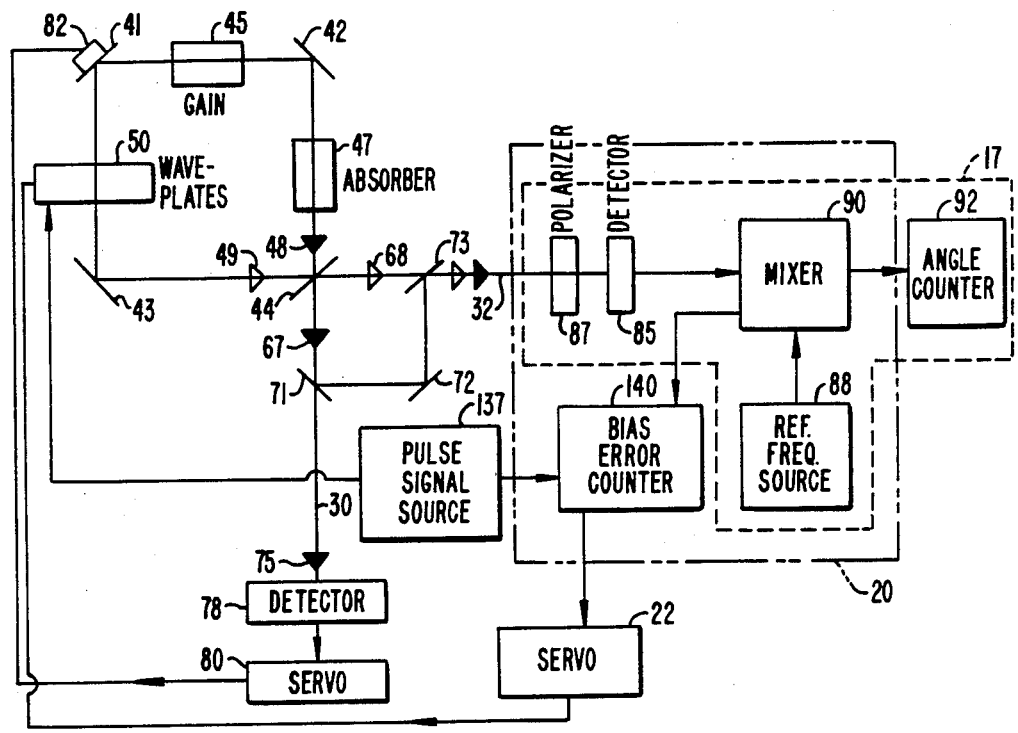
FIG.—9.
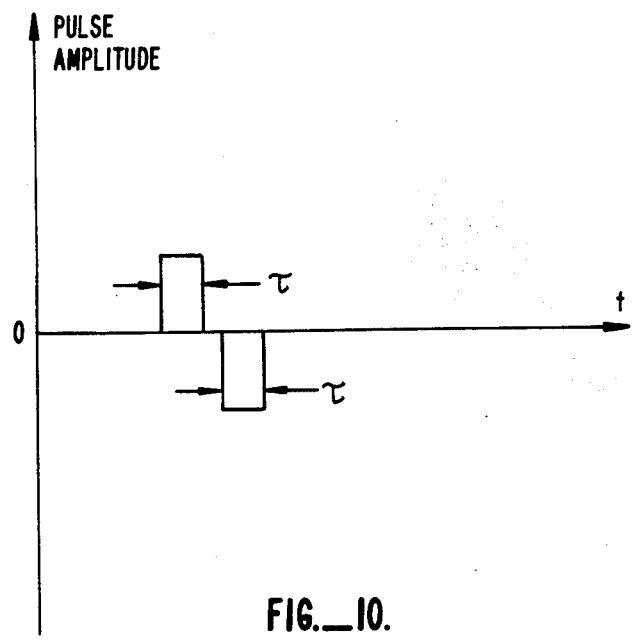
FIG.—10.

STABILIZED RING LASER BIAS SYSTEM

BACKGROUND OF THE INVENTION

1. Field of the Invention

This invention relates generally to ring lasers, and more particularly to method and apparatus for biasing a ring laser so as to avoid the lock-in effects that must be overcome to sense rotation at low angular rates.

2. Description of the Prior Art

Ring lasers are useful, practical devices because of their extreme sensitivity to non-reciprocal effects such as rotational motion. Thus, a ring laser may serve as a rotation sensor. In this application it performs the function of a gyroscope and is thus commonly referred to as a ring laser gyroscope.

A ring laser rotation sensor is based on the following principle of operation. A ring laser supports traveling-wave modes of oscillation that propagate in opposite directions around the perimeter of the ring, the geometry of which is typically a square or a triangle. In the absence of rotation, the round-trip optical path is the same for two waves propagating in opposite directions, and the generation frequency for the two waves is the same. Rotational motion, however, has the effect of making the optical path longer in one direction and shorter in the other, whereupon the two contra-directional traveling waves are generated with a difference in frequency proportional to the angular rate. If the two output beams are made to interfere by bringing them to substantially parallel coincidence upon a square-law photodetector, the photodetector generates an electrical signal at the beat frequency.

However, such devices suffer from the problem that a signal frequency is not observable unless the angular velocity exceeds a certain critical value, typically on the order of several hundred degrees per hour. Below this critical value, the beat note frequency vanishes. Because of this phenomenon, known as "lock-in," the instrument fails to respond to rotation rates less than the critical, or "lock-in" rate. Lock-in is the result of small amounts of coupling, via backscatter, between the two contra-directional traveling waves.

Many applications require that the instrument respond to rotation rates several orders of magnitude below the lock-in rate. Fortunately, this capability may be achieved by biasing the ring laser, so that even when the instrument is at rest, the two contra-directional waves are generated with different frequencies. In this way the lock-in effects are overcome, and the ring laser is sensitive to the very low angular rates sought to be sensed or measured.

Biasing is conventionally accomplished by application of a non-reciprocal effect—that is, any effect that introduces a directional anisotropy, so that optical pathlength is different for the two directions of propagation. Typically this is either a controlled rotational motion or a magneto-optic effect such as the Faraday effect or the Kerr magneto-optic effect.

The most straightforward procedure is to establish a bias that is constant in time. Then the output difference frequency is the bias frequency if the instrument is stationary, but departs from the bias value if the instrument undergoes rotation in the plane of the ring. The principal difficulty with a constant bias is the fact that bias drift cannot be distinguished from true rotation. The ring laser responds in the same fashion to the one or to the other.

It is therefore essential to stabilize a fixed bias, which requires control of those physical parameters whose variations cause the bias to shift. In the case of a fixed rotational bias, the ring cavity is rotated at a constant rate, and the constant angular (bias) rate is the bias parameter that must be stabilized. In the case of a fixed magneto-optic bias, the applied magnetic field and a material magneto-optic constant (which is temperature sensitive) are the bias parameters that must be stabilized. Control is effected by monitoring the relevant parameters (mechanical, magnetic, thermal), that is, by measuring each relevant parameter and comparing the measured value with a reference value. If the two values are unequal, a correction can be applied to null the difference.

The success of such stabilization is limited by the fact that the ring laser is extremely sensitive to variations in the bias parameters. Thus, a small change in a bias parameter produces a significant bias shift, and good bias stability depends on the ability to measure and control the relevant bias parameters to high precision. In practice it is difficult to stabilize a fixed bias generated by a non-reciprocal effect to the degree required in most applications.

The stability problems inherent in a fixed, non-reciprocal bias are partially overcome if an alternating bias is employed. According to this method, exemplified in U.S. Pat. No. 3,373,650 (Killpatrick), the bias sense is periodically reversed, between positive and negative, twice each bias cycle. Typically, the reversal is accomplished either by a small-amplitude oscillatory motion of the entire ring cavity ("mechanical dither") or by an alternating magnetic field applied to an intra-cavity magneto-optic element. An alternating bias has the advantage that the control requirements are less severe than those of a fixed bias, but has the disadvantage that the difference frequency must pass through the lock-in zone (where the instrument is insensitive to rotation) twice each bias cycle.

Another prior art bias method employs two fixed biases in the same ring cavity by generating two traveling waves in each direction, rather than one, so that there are four waves in all. Thus four distinct optical frequencies are generated by these systems, which are known variously as multi-oscillator laser gyros, four-wave systems, and four-mode systems. The objective of such systems, exemplified in U.S. Pat. No. 4,006,989 (Andringa) and U.S. Pat. No. 3,862,803 (Yntema, et al.), is to cancel errors due to bias drift by subtracting two nominally equal bias frequencies. However, a four-wave system introduces complexities and error terms not present in a two-wave system. As will be seen below, the present invention pertains solely and strictly to two-wave systems.

The control requirements for a fixed bias are substantially reduced if bias information is obtainable directly from the ring laser output. One way to do this is to generate a second pair of waves, following the method taught in U.S. Pat. No. 3,807,866 (Zingery), wherein the bias frequency is obtained by measuring the beat frequency generated by two co-directional waves. This is again a four-wave system and subject to the same difficulties of other four-wave systems. A second way to obtain bias information directly from the ring laser output is described in U.S. Pat. No. 3,879,130 (Greenstein). According to this technique, the ring laser is operated as a two-wave system, and a fixed bias is generated by means of an intra-cavity saturable absorber. Bias variations produce a characteristic change in output intensity, which can be monitored to detect a shift in the bias with respect to a reference value. This method has the disadvantage that the bias frequency is bounded below by the axial mode spacing c/p (c=velocity of light, p=ring perimeter); for small ring perimeter, the minimum bias frequency is unacceptably large.

SUMMARY OF THE INVENTION

The present invention provides method and apparatus for establishing a fixed bias in a two-wave ring laser, at a frequency less than the axial mode spacing. Bias drift may be distinguished from true rotation, and a bias error signal is obtainable directly from the ring laser output.

According to the present invention the ring laser cavity is made birefringent by disposing a plurality of birefringent elements in the cavity. Consequently, cavity modes are designated by polarization as well as parameters pertaining to the spatial properties of a mode in an isotropic cavity. The ring laser is operated by exciting two different polarization modes so as to generate two traveling waves that propagate in opposite directions. For the ring laser at rest, the two waves are generated with a difference in frequency that represents the bias. The frequency difference, which is a function of cavity birefringence, is less than the axial mode spacing if the two polarization modes are adjacent polarization modes.

In response to angular motion, the difference frequency is shifted away from the bias value. However, any change in the bias (relative to a reference value) also causes the difference frequency to change. Thus bias shifts may result from changes in cavity birefringence, which are unavoidable.

As noted above, the present invention provides an error signal indicative of bias shift, but distinguishable from the effects of true rotation, on the basis of the ring laser output. The bias error signal may be the input to a servo control system that continually adjusts cavity birefringence so as to null the bias error signal, or continually adjusts the frequency of an external reference frequency source, disposed for bias subtraction, so as to null the bias error signal.

The bias error signal is derived by measuring a property of the ring laser output that is correlated with cavity birefringence but is substantially independent of rotation rate. One such property is the polarization of one of the output beams extracted from the ring laser. Another such property is the change in the difference frequency that results when cavity birefringence is altered in a specific way.

In a first embodiment of the present invention, the plurality of birefringent elements in the ring cavity comprises a waveplate and a rotator, and the optical property measured to derive the bias error signal is the state of polarization of either output beam. In particular, the bias frequency may be determined by measuring the orientation and ellipticity of the polarization ellipse of one output beam, and compared with the frequency of the external reference. The difference between these two frequencies represents the bias error to be nulled.

In a second embodiment of the present invention, the plurality of birefringent elements comprises two misaligned waveplates that are nominally half-waveplates. Here the misalignment angle determines a reference value for the bias frequency, and bias error signals indicate phase errors of the waveplates, with zero errors corresponding to perfect half-wave plates.

In the second embodiment, the bias error signal may be derived by two techniques. The first technique is (as in the first embodiment) based on polarization. Cavity birefringence is modulated in a prescribed way, whereupon the output beam polarizations are modulated. Consequently, the signal generated by polarization-detection apparatus contains modulated components, which are then demodulated to provide the desired bias error signal. The second technique is based on frequency. Cavity birefringence is altered by means of a sequence of pulsed interrogation signals, and a difference frequency measurement is made for each step of the sequence. The set of numbers thus generated are then combined to yield two numbers that are proportional to the phase errors, and that therefore comprise the desired bias error signal.

A further understanding of the nature and advantages may be realized by reference to the following detailed description and accompanying drawings.

BRIEF DESCRIPTION OF THE DRAWINGS

FIGS. 1A and 1B are block schematics illustrating the basic subsystems of the the present invention;

FIG. 2 is a partial schematic showing components by which certain of the subsystems may be realized;

FIG. 3 illustrates a part of the mode spectrum of a birefringent cavity;

FIG. 4 illustrates the variations of intensity vs. cavity tuning when the mean frequency of the two output beams is close to the absorption center frequency;

FIG. 5 is a schematic diagram for the first embodiment of the invention;

FIG. 6 is an oblique schematic view of the birefringent elements characterizing the second embodiment;

FIGS. 7A–7C illustrate various waveplate configurations for the second embodiment;

FIG. 8 is a schematic diagram for the second embodiment that utilizes a first method for deriving a bias error signal;

FIG. 9 is a schematic diagram for the second embodiment that utilizes a second method for deriving a bias error signal; and FIG. 10 is a plot illustrating a two-pulse interrogation waveform for the second method.

DETAILED DESCRIPTION OF THE INVENTION

Overview

The basic features of the present invention may be summarized as follows:
(1) A ring laser having a birefringent cavity is operated as a two-wave system, with one wave propagating in each direction.
(2) The two waves are generated on two adjacent polarization modes through the action of an intra-cavity saturable absorber.
(3) The two waves are generated at different frequencies, with the difference frequency for zero rotation rate being the bias. Rotation is detected by observing the departure of the difference frequency from the bias value.
(4) Cavity birefringence is established by disposing in the cavity a plurality of birefringent elements.

(5) Measurements are made on the ring laser output to yield information that is sensitive to the bias value, but substantially insensitive to rotation rate.

FIGS. 1A and 1B illustrate, in block schematic form, the basic subsystems of the present invention. Broadly, a ring laser system comprises a ring laser 12, external beam optics 15, difference frequency apparatus 17, bias information apparatus 20, a servo 22 for nulling a bias error signal, and pathlength control apparatus 25. As will be described more fully below, ring laser 12 is configured with a birefringent cavity and operates in a two-wave state to provide two output beam components, designated collectively 27, to external beam optics 15. External beam optics 15 directs the two beam components along paths that include a single-beam path 30, a dual-beam path 32, and a beam path 33 which may be a single-beam path or a dual-beam path. The single beam component directed along path 30 is directed to path control apparatus 25 which tunes the ring cavity. The combined beam directed along path 32 is directed to difference frequency apparatus 17 for determining the difference in frequency between the beam components relative to the bias frequency. The beam component(s) directed along path 33 is (are) directed to bias information apparatus 20 which measures an optical property that is correlated with cavity birefringence, and hence with bias value.

The function of bias information apparatus 20 is to generate a signal representative of the difference between the actual bias and a reference value. This difference constitutes a bias error signal that is transmitted to servo 22. In conventional manner servo 22 responds so as to null the bias error signal. According to the present invention, nulling may be effected by adjusting difference frequency apparatus 17 (FIG. 1A) or by adjusting the birefringence of the cavity of ring laser 12 (FIG. 1B). Systems utilizing each procedure are described below.

FIG. 2 is a partial schematic illustrating specific components for ring laser 12, external beam optics 15, difference frequency apparatus 17, and pathlength control apparatus 25.

Ring laser 12 comprises a ring cavity defined by three or more reflectors (mirrors or reflecting prisms), illustrated in FIG. 2 as three highly reflecting mirrors 41, 42, and 43 and a partially transmitting output mirror 44. The cavity contains an excited gain medium 45 and a saturable absorber 47, which promotes the simultaneous generation of contra-directional waves 48 and 49 at different frequencies, as described below. Ring geometry is immaterial for the purposes of the present invention, and although FIG. 2 shows a square-shaped ring, a ring in the form of a triangle or other polygon is equally suitable.

According to the present invention the ring cavity contains a plurality of birefringent elements 50 that render the cavity birefringent. In this context, "plurality" excludes any combination of like birefringent elements that is equivalent to a single birefringent element of the same type. For example, a sequence of waveplates whose proper axes are all parallel is equivalent to a single waveplate, and hence excluded. Similarly, a sequence of rotators is equivalent to a single rotator, and hence excluded.

Any particular embodiment of the invention is characterized by a specific plurality. Two particular embodiments are discussed below—a first embodiment, wherein the specific plurality comprises a Cartesian birefringent element and a rotator, and a second embodiment, wherein the specific plurality comprises two misaligned waveplates that are nominally half-wave plates.

In any embodiment the plurality of birefringent elements 50 constitutes the principal polarization anisotropy of the ring cavity; that is, the cavity is otherwise substantially isotropic with respect to polarization. However, it is not essential that birefringent elements 50 comprise separate, discrete elements as illustrated in FIG. 2. One or more of the plurality of birefringent elements 50 may comprise reflecting or transmissive elements that also serve some other function, such as a cavity mirror or a cell window.

A description of the basic ring laser operation will be interposed at this point, after which the remaining elements of FIG. 2 will be described.

In a birefringent cavity, modes are distinguished on the basis of polarization, in addition to those other parameters that define spatial modes of an isotropic cavity. FIG. 3 illustrates a part of the mode spectrum for a birefringent cavity. Dashed lines 52 and 53 indicate the frequencies of two adjacent axial modes having integral mode numbers q and q+1, as defined for the isotropic cavity. Because of birefringence each axial mode is split into two components; these polarization modes have frequencies as shown by solid lines 54 and 55 for axial mode q, and 57 and 58 for mode q+1.

In general, for each spatial mode, the two polarization modes have different frequencies and different polarizations. The frequency separation between adjacent polarization modes is less than the axial mode spacing, whether the adjacent polarization modes belong to the same axial mode or to adjacent axial modes.

According to the present invention, ring laser 12 is operated so that a clockwise (cw) wave is generated on a first polarization mode, and a counter-clockwise (ccw) wave is generated on a second and adjacent polarization mode. These two waves are the only waves that are generated. In particular, there is no wave belonging to the first polarization mode propagating in the ccw sense, and no wave belonging to the second polarization mode propagating in the cw sense.

Saturable absorber 47 allows two-wave operation of the type described in the preceding paragraph to be achieved. The role of the saturable absorber in promoting the desired two-wave operation is explained in detail in U.S. Pat. No. 3,879,130, with particular reference to two waves generated on adjacent axial modes in an isotropic cavity. In the present invention, the saturable absorber plays the same role, but the two waves are generated on adjacent polarization modes of an anisotropic (in this case birefringent) cavity.

As described in U.S. Pat. No. 3,879,130, the desired two-wave operational state is established by first exciting unidirectional generation on one polarization mode and then tuning the cavity so that the mean frequency of that one polarization mode and an adjacent polarization mode is substantially coincident with the center frequency $f_0$ of a saturable absorber resonance. Tuning is conventionally accomplished by adjusting cavity pathlength.

When the mean frequency has been tuned to the absorption center frequency, the desired two-wave operational state will exist, whereas only a single wave is generated if the indicated tuning condition is not satisfied. This behavior is the basis of pathlength stabilization and insures simultaneous generation of contradirectional traveling waves on two adjacent polarization modes.

The procedure may be described with reference to FIG. 4, which shows plots 60 and 62 of the two output beam intensities $I_1$ and $I_2$ as a function of $\bar{f}$, the mean frequency of two adjacent polarization modes. The mean frequency varies as the cavity is tuned. When the tuning condition $\bar{f}=f_0$ is satisfied, the intensity $I_1$ of the first wave passes through a local minimum, and the intensity $I_2$ of a second and contra-directional wave passes through a local maximum. By monitoring the intensity of either output beam, or the difference of the two, it is possible to determine when the desired tuning condition $\bar{f}=f_0$ is satisfied. Behavior of the type illustrated in FIG. 4 will also be observed if the mean frequency of two non-adjacent polarization modes is tuned to the absorption center frequency, but in this case the difference frequency will be higher than that observed for adjacent polarization modes.

An absorber, in order to be suitable for the purposes of this invention, must have an absorption resonance at approximately the same frequency as the laser operating frequency. The latter falls within the frequency band of a selected working resonance of the gain medium. Thus, a necessary condition is that there exist an absorption resonance whose frequency band is substantially coincident with that of the working resonance of the gain medium. For a helium-neon gain medium, appropriate absorbers include methane, for operation at wavelength 3.4 microns, and excited neon, for operation at wavelength 0.63 microns.

Once the desired two-wave state has been established, there exist in the cavity two waves (48 and 49) propagating in opposite directions with different frequencies. For the ring laser at rest, the frequency difference is the bias frequency. This might be the difference in frequency between the two polarization modes shown as lines 54 and 55 of FIG. 3, if polarization modes of the same axial mode are used, or the difference in frequency between the two polarization modes shown as lines 55 and 57, if the two polarization modes belong to adjacent axial modes. In either case the response to rotational motion is to shift one frequency to a higher value and the other to a lower value. Thus, the difference frequency is altered relative to the bias.

In view of the above description of laser operation, the remaining elements in FIG. 2 will be described.

Portions of waves 48 and 49 are extracted from the cavity through partially transmitting mirror 44 to define respective external beam components 67 and 68. Many possibilities exist for external beam optics 15. By way of illustration, FIG. 2 shows three beamsplitters 71, 72 and 73 which combine portions of the two output beams 67 and 68 so that along path segment 32 the two beam components are substantially parallel and in substantial coincidence. Additionally, the external beam optics makes available single beam components 75 and 76. The former is directed along path 30 to obtain a signal for pathlength control. The latter is used to generate a bias error signal based on the polarization state of a single beam, as will be described below.

Pathlength control apparatus 25 includes a photodetector 78 interposed in path 30, a servo 80, and a tuning element such as a piezoelectric transducer 82 attached to mirror 41. Pathlength servo 80 causes the position of mirror 41 to be adjusted, by applying a voltage to tuning element 82, in response to the electrical signal from photodetector 78. This signal is proportional to the intensity $I_1$ or $I_2$, depending on whether the beams 67 and 68 correspond to $I_1$ and $I_2$, or $I_2$ and $I_1$, respectively. Following conventional methods known in the art of servo control, servo 80 locks the cavity tuning to a stationary point on the intensity vs. tuning function shown in FIG. 4; at the stationary points, the respective first derivatives of the functions are zero.

Detection of the difference frequency is conventionally accomplished by bringing the two output beams to substantially parallel coincidence upon a square-law photodetector. Difference frequency apparatus 17 includes a photodetector 85, a polarizer 87, a stable reference frequency source 88, a mixer 90, and a counter 92. Reference frequency source 88 may comprise a reference frequency oscillator, such as a quartz or rubidium frequency standard, and an adjustable frequency-synthesizing network.

The two parallel beam components are directed along common path 32 to the surface of photodetector 85, the output of which is an electrical signal with a component at a frequency equal to the optical difference frequency. Polarizer 87 ensures that the two beams incident on detector 85 have the same polarization, so that the fringe pattern moving across the surface of the detector will have high contrast. The output of photodetector 85 is combined with the output of reference frequency source 88 at mixer 90 to remove the bias frequency, so that instrument output, as measured at counter 92, pertains solely to rotational motion. Accordingly, the frequency of reference source 88 and the bias frequency are adjusted to be equal. Thus, since subtraction of the bias frequency occurs at mixer 90, the mixer output is an electrical signal of a frequency equal to the shift in optical difference frequency induced by rotation. Counter 92 counts the cycles of mixer output signal, each cycle corresponding to a specific angular displacement. With bias subtraction, the instrument has zero output (counter 92) for zero input (angular rate).

In the present invention two contra-directional traveling waves are generated on adjacent polarization modes. This insures that the bias frequency will be less than the axial mode spacing, for arbitrary cavity birefringence. The bias frequency $f_B$ is related to cavity birefringence $\Phi$ through the relationship $$f_B = \frac{c}{2\pi p} \phi \qquad \text{(Eq. 1)}$$

where c is the velocity of light and p is the cavity pathlength. Thus, by appropriate choice of cavity birefringence $\Phi$ a desired bias frequency can be generated. For example, with a pathlength p=30 cm, a bias frequency of 100 MHz results if cavity birefringence $\Phi=\pi/5$ radians, whereas bias frequency is 10 MHz for cavity birefringence $\Phi=\pi/50$ radians.

Cavity birefringence is thus the principal bias parameter. However, changes in birefringence are unavoidable, because of temperature variations and changes in stress conditions. If cavity birefringence changes, the bias frequency changes, and a signal might be recorded at the counter 92 that would falsely be interpreted as rotation.

The present invention overcomes this problem in that changes in bias frequency due to changes in cavity birefringence are detected on the basis of some property of the ring laser output. Once a bias shift has been detected, the bias shift can be compensated by appropriate adjustment of reference frequency source 88 (FIG. 1A), or the cavity birefringence can be adjusted to restore the bias frequency to its original value (FIG. 1B).

In order to design a complete system, it is necessary to:

(1) define a particular embodiment (that is, a particular plurality of birefringent elements);
(2) specify a particular bias information apparatus 20, for detecting bias shift, that is suitable to that embodiment; and
(3) choose an appropriate method of control, following either FIG. 1A or 1B.

The two specific embodiments discussed below also serve to exemplify different methods and apparatus for detecting bias shift and for responding to a bias error signal, to effect the desired control.

First Embodiment

FIG. 5 is a schematic view of the first embodiment of the present invention. Ring laser 12, external beam optics 15, pathlength control apparatus 25, and difference frequency apparatus 17 are realized with the specific components shown in FIG. 2, as discussed above.

This first embodiment is characterized in that birefringent elements 50 comprise a Cartesian birefringent element 95 and a rotator 97. The optical property measured to obtain bias information is the polarization state of one of the output beams, in particular beam component 76. Bias information apparatus 20 comprises a polarization detector 98, a frequency counter 99, a computer 100, and appropriate interfaces (not shown). The polarization parameters measured by polarization detector 98 are converted into a computed bias value by computer 100, which compares the computed bias frequency with the frequency of the signal from reference frequency source 88 and delivers a bias error signal representing the difference to the servo 22. In response to a non-zero bias error, servo 22 adjusts the frequency of source 88 so as to null the difference. This first embodiment therefore exemplifies the nulling method illustrated in FIG. 1A.

The Cartesian birefringent element is typically a waveplate, but may be any element that introduces a phase shift between two polarization components along two mutually perpendicular proper axes. Common waveplates are quarter-wave and half-wave plates, for which the phase shifts are $\pi/2$ and $\pi$ radians, respectively. The rotator exhibits circular-type birefringence and introduces a phase shift between two components of opposite circular polarization. The rotator may be a natural rotator or a Faraday rotator.

For this configuration the cavity birefringence $\Phi$ is determined from the relation $$\cos(\Phi/2) = \cos(\alpha/2) \cos(\beta/2) \qquad \text{(Eq. 2)}$$

where $\alpha$ is the circular birefringence and $\beta$ is the Cartesian birefringence.

In an alternative but equivalent configuration the Cartesian birefringent element is implemented as one or more cavity reflectors exhibiting p-s birefringence, namely a difference in phase shift upon reflection between the p and s polarization components (parallel to and perpendicular to, respectively, the plane of the ring, in conventional notation). In this alternative configuration, the total p-s birefringence for all reflectors is the net Cartesian birefringence $\beta$.

A suitable material for rotators and waveplates for He-Ne lasers operating at wavelengths of 0.63 microns or 3.4 microns is quartz. Quartz behaves like a rotator if the beam propagates along the optic axis (Z-cut quartz), but exhibits Cartesian birefringence if the beam propagates in a direction normal to the optic axis (X-cut quartz). The thickness of the quartz plate in the direction of beam propagation determines the amount of circular or Cartesian birefringence, as the case may be.

As stated above, for this first embodiment, measurements are made to determine the polarization state of either output beam. Both the circular and Cartesian birefringences are assumed to be non-zero, but are otherwise arbitrary. The beam polarization is therefore elliptical, and the measured parameters are the orientation $\theta$ of the major axis of the polarization ellipse, with respect to the orientation of a proper axis of waveplate 95, and the ratio $\rho$ of the semi-minor to semi-major axis of the ellipse.

Knowledge of the values of $\theta$ and $\rho$ implies knowledge of circular birefringence $\alpha$ and Cartesian birefringence $\beta$, through the relations $$\alpha = 4\theta \qquad \text{(Eq. 3a)}$$

$$\tan\frac{\beta}{2} = \frac{1}{2}\left(\frac{1}{\rho} - \rho\right) \sin 2\theta \qquad \text{(Eq. 3b)}$$

The measured values of $\theta$ and $\rho$ are independent of angular motion, so the bias frequency can be determined at any time simply by measuring the polarization parameters $\theta$ and $\rho$.

Methods for measuring the polarization parameters $(\theta, \rho)$ are well known in the science of polarimetry, known alternatively as ellipsometry. Furthermore, instruments for making such measurements are commercially available. Thus, polarization detector 98 may comprise a polarimeter. Beamsplitters 71 and 72 should be polarization-conserving beamsplitters so that beam component 76 has the same polarization state as output beam 67. Alternatively, a cavity reflector other than mirror 44 can be made partially transmitting to obtain an output beam that is incident directly on polarization detector 98.

A simple version of polarization detector 98 comprises a polarizer and a photodetector, with the orientation of the polarizer being variable. The polarizer orientation that maximizes the intensity recorded by said photodetector is the major axis orientation $\theta$, and the parameter $\rho$ is given by $$\rho^2 = I_{min}/I_{max} \qquad \text{(Eq. 4)}$$

where $I_{min}$ and $I_{max}$ are the minimum and maximum intensities recorded by the photodetector as the polarizer orientation is varied.

Second Embodiment

The specific birefringent elements 50 that characterize the second embodiment comprise two misaligned half-wave plates. The second embodiment exemplifies the nulling method indicated in the general system diagram of FIG. 1B, wherein it is cavity birefringence that is adjusted by the servo 22, in response to a bias error signal. Two versions will be described, differing in the particular optical property measured to derive a bias error signal. In the first version, the measurement pertains to the polarization state of one beam; in the second version, the measurement pertains to the difference frequency.

FIG. 6 is a schematic oblique view of the ensemble of birefringent elements 50, comprising two waveplates 105 and 107 that are nominal half-wave plates, the proper axes of which are misaligned. A "nominal half-wave plate" is a waveplate that is manufactured as a half-wave plate, with a nominal phase shift of $\pi$ radians, but whose true phase shift inevitably differs somewhat from the nominal value of $\pi$ radians due to manufacturing imprecisions and the temperature and stress dependence of the phase shifts.

For two perfect half-wave plates, each having phase shift precisely equal to $\pi$ radians, the waves generated on the polarization modes have perfectly circular polarizations, of opposite circular sense (right and left circular polarizations, in conventional language) The cavity birefringence $\Phi$ in this case is given by $$\Phi = 4\psi \qquad \text{(Eq. 5)}$$

where $\psi$ is the misalignment angle measured between the fast axis of one half-wave plate and the slow axis of the other. If the ring laser is operated on two adjacent polarization modes belonging to the same axial mode, the bias frequency $f_B$ is $$f_B = \frac{c}{p} \cdot \frac{2\psi}{\pi} \qquad \text{(Eq. 6)}$$

If the adjacent polarization modes belong to adjacent axial modes, the bias frequency $f_B$ is $$f_B = \frac{c}{p} \left(1 - \frac{2\psi}{\pi}\right) \qquad \text{(Eq. 7)}$$

In either case the bias frequency is less than the axial mode spacing for misalignment angles $\psi$ less than $\pi/2$ radians.

In this second embodiment waveplates 105 and 107 are rigidly attached, either to each other or to a common support structure, so that the misalignment angle $\psi$ is fixed. The bias frequency then has the nominal value shown in the above equations, if the two waveplates are perfect half-wave plates. Departure of the individual phase shifts from the reference value of $\pi$ radians represents a phase error that will cause the bias frequency to shift from the nominal value, which is here the reference value.

Thus, according to the second embodiment, phase errors in the individual waveplates will generate a bias error signal, and the response to a bias error signal is made by adjusting cavity birefringence to null the phase errors. For this to be possible, the phase shifts of the two waveplates must be adjustable. Furthermore, the bias error signal for both versions is derived by perturbing the phase shifts in a prescribed manner. For this reason, also, the phase shifts must be adjustable.

The proper axis orientations of the two waveplates are shown in FIG. 6. The two proper axes of each waveplate are normal to the direction of beam propagation ($\pm z$-directions) and to each other. Thus, for waveplate 105 the proper axes are along the x and y directions while for the waveplate 107 the proper axis directions are along x' and y'.

FIG. 7A is an oblique view illustrating a first configuration for the phase-variable waveplates appropriate to the second embodiment. The two waveplates 105' and 107' are rigidly attached to a common support structure 108, which may be a block of glass, glass-ceramic, or other material having a low temperature coefficient of expansion. The phase shifts are varied by electro-optic effect. The simplest procedure is to apply electric fields to the waveplates in directions perpendicular to the direction of beam propagation ($\pm z$). In this case parallel electrodes are attached to each waveplate. The electrodes for waveplate 105' are attached to leads 112; those for waveplate 107' to leads 113.

FIG. 7B is an oblique view illustrating a second waveplate configuration for the second embodiment of the present invention. The two waveplates 105" and 107" are again rigidly attached to a common support structure, in this case a hollow cylindrical block 115. Cylindrical block 115 is formed with an interior hole about the cylindrical axis along which the two contra-directional beams propagate. The material composition of cylindrical block 115 is the same as that of support block 108 of FIG. 7A. Waveplates 105" and 107" are oriented with respect to each other as described above and are attached to the cylinder ends. The phase shifts of the waveplates are varied by means of the photoelastic effect. Each half-wave plate carries a plurality of piezoelectric actuators 117 on its periphery. Voltage signals applied to piezoelectric actuators 117 cause corresponding deformation with resultant variation of the phase shifts of waveplates 105" and 107".

FIG. 7C shows a third waveplate configuration for the second embodiment of the present invention. The two waveplates 105''' and 107''' are cylindrical, and are rigidly attached to each other, for example, by fusion along their outer peripheries. The contra-directional beams propagate along the cylinder axis ($\pm z$-directions). Phase shifts of the half-wave plates are varied by means of electro-optic effect. The assembly carries a first pair of electrodes and a second pair of electrodes attached respectively to the electrode mounts 120 and 122. The four electrode surfaces all lie in the plane defined by the circular surface of the two waveplates at their juncture. A voltage applied between the electrodes attached to mounts 120 produces an electric field that is spatially concentrated within the volume occupied by waveplate 107''' and that is orthogonal to the cylinder axis at points along the axis. This applied voltage therefore alters the phase shift of waveplate 107''' without any appreciable effect on the other waveplate 105'''. Similarly, a voltage applied between the electrodes attached to mounts 122 alters the phase shift of waveplate 105''' without any appreciable effect on waveplate 107'''.

Regardless of the particular waveplate configuration in the second embodiment of the invention, suitable waveplate materials include quartz, KDP, $LiNbO_3$, and $LiTaO_3$, for operation in the visible, and quartz or $MgF_2$ for operation in the infrared, if the laser gain medium is helium-neon.

FIG. 8 is a schematic view of a first version of the second embodiment, wherein a bias error signal is derived from a measurement on the modulated polarization of one output beam. In particular, the phase shifts of the two nominal half-wave plates are modulated by signals from a modulator 124 whereupon the polarizations of the two output beams are also modulated. The single beam component 76 is delivered by external beam optics 15 to bias information apparatus 20, comprising a polarization detector 125 and a demodulator 127. Polarization detector 125 may comprise a polarizer followed by a photodetector. Demodulator 127 may comprise a phase-sensitive (or synchronous) detector that receives an electrical output signal from polarization detector 125 together with a signal from modulator 124 that is representative of the modulation signal applied to the waveplate assembly.

The modulation signal contains two frequency components and is applied in such a way that specific linear combinations (sum and difference) of phase shifts of the two waveplates are modulated. In particular, a first component of the modulation signal having a first modulation frequency induces equal phase shift changes in the two waveplates. A second component having a second modulation frequency induces phase shift changes in the two waveplates that are equal in magnitude but opposite in sign. The modulation signal is applied continuously by means either of the electro-optic effect or photoelastic effect, as discussed above.

The electrical signal output of polarization detector 125 contains frequency components at the first and second modulation frequencies. The detector output signal is demodulated (by demodulator 127) at the two modulation frequencies to produce first and second demodulation amplitudes that together comprise the bias error signal that is input to servo 22. The sum and difference of the phase shifts are then adjusted by servo 22 in response to the first and second demodulation amplitudes, respectively, which are thereby nulled. The adjustment may be effected by means of electro-optic or photoelastic effect, as described above.

Since it is particular linear combinations of the two phase shifts that are modulated and adjusted, rather than the phase shifts of the individual waveplates, the signals for modulating and the signals for adjusting are applied by modulating or adjusting the particular linear combinations. For the three waveplate configurations described in connection with FIGS. 7A–C, the signals are voltage signals. Thus, the first and second modulation signals are generated by applying voltages to each of the waveplates that have a first and second ratio, respectively. For the first ratio, the two phase shifts change by equal amounts, whereas for the second ratio, the two phase shifts change by amounts that are equal in magnitude but opposite in sign. The first and second ratios apply equally to signals for adjusting the phase shift, to null the two demodulation amplitudes that comprise the bias error signal.

As a simple example, consider the configuration shown in FIG. 7C, where the two waveplates 105''' and 107''' are made from the same material and fabricated in substantially the same way. In the special case that the angular misalignment between electrode mounts 120 and 122 is equal to the misalignment angle $\psi$ between the two half-wave plates, the electro-optic coefficient (phase shift per unit voltage) is the same for the two waveplates. In this case, the first and second voltage ratios are $+1$ and $-1$, respectively.

FIG. 9 is a schematic view of a second version of the second embodiment, wherein a bias error signal is derived by making a sequence of difference frequency measurements. In particular, the phase shifts of the two nominal half-wave plates are altered by a series of discrete-pulse interrogation signals, whereupon the difference frequency is altered during the discrete time interval of each pulse.

For this second version of the second embodiment the optical property measured by bias information apparatus 20 is a difference frequency. However, apparatus for measuring optical difference frequency is already in place, namely, polarizer 87 and photodetector 85 that receive the dual beams on path segment 32, so it suffices to use the difference frequency apparatus 17 already available.

Each interrogation consists of two discrete pulses displaced in time, with shapes that would be mirror images of each other in the time axis if the two pulses were simultaneous. FIG. 10 illustrates the particular case of square pulses of equal time duration $\tau$, with pulse amplitudes that are equal in magnitude but opposite in sign.

The pulses are generated by a pulse signal source 137. For the waveplate configurations of FIG. 7, this is a voltage signal which is applied to the waveplates in such a way that each pulse induces changes in a linear combination of phase shifts; in particular, for one set of pulses the linear combination is the sum of the phase shifts of the two waveplates, whereas for another set of pulses the linear combination is the difference. This is accomplished by applying voltages to the individual waveplates that have the first and second ratios, respectively, discussed above.

The two-pulse interrogation is applied in sequence to the sum and difference. Thus, for the square pulse shape of FIG. 10, for one part of the sequence, the sum of the individual phase shifts assumes the value $A+\Delta A$ during the time interval of the first pulse and the value $A-\Delta A$ during the time interval of the second pulse, where A is the sum in the absence of interrogation pulses. Similarly, as the second part of the interrogation sequence, the difference between the individual phase shifts assumes the values $B+\Delta B$ and $B-\Delta B$ during the intervals of the first and second pulses, where B is the difference in the absence of interrogation. For perfect half-wave plates, $A=2\pi$ radians and $B=0$.

For this second version, a bias error counter 140 records the number of cycles of a signal whose frequency is representative of the optical difference frequency, during the time interval of each interrogation pulse. A frequency "representative" of the optical difference frequency is either the difference frequency, or a frequency differing from the difference frequency by a known frequency (frequency shifting), or a frequency obtained by multiplying or dividing the difference frequency by a known factor (frequency multiplication or division), or a frequency obtained by some combination of the operations described.

Such a frequency representative of the optical difference frequency is available from mixer 90 and is received by bias error counter 140. Counter 140 is gated by the interrogation pulses, that is, the counter is open and accumulating counts during each pulse interval, but is closed otherwise. For each two-pulse interrogation, bias error counter 140 records the difference between the number of counts accumulated during the first pulse and the number accumulated during the second pulse. The result of one complete interrogation is two numbers, the first being the difference between the number of counts when the two-pulse interrogation is made on the sum of the phase shifts, and the second being the difference between the number of counts when the two-pulse interrogation is made on the difference of the phase shifts. If these two numbers are both zero, the phase errors are both zero, indicating that the two waveplates are perfect half-wave plates and that the bias frequency is the nominal value. If these numbers are not both zero, servo 22 generates error correction signals proportional to these numbers, whereby the sum and difference of the phase errors, and hence the individual phase errors are also nulled. The phase shifts are adjusted as discussed above.

Conclusion

In summary, the present invention provides for the stabilization of the bias in a two-wave ring laser with a bias frequency less than the axial mode spacing. Bias drift may be distinguished from true rotation by monitoring the ring laser output.

While the above is a complete description of the preferred embodiments of the invention, and while a number of possible alternate constructions and modifications were suggested, a variety of additional equivalent structures may be employed. For example, while the particular two-pulse interrogation sequence utilizing square pulses is shown, other pulse shapes may be used. Therefore, the above description should not be taken as limiting the scope of the invention which is defined by the appended claims.

What is claimed is:

1. A method of operating a ring laser whose structure includes an excited gain medium disposed in a ring cavity, and whose operational state is characterized in that only two traveling waves are generated, the two waves being of different frequencies and propagating in opposite directions, the difference in frequency being responsive to rotation but representing a bias frequency for the ring laser at rest, comprising the steps of:
   disposing in the cavity a plurality of birefringent elements, whereupon the cavity is birefringent and certain cavity modes are polarization modes characterized by polarization and axial mode number;
   generating the two traveling waves on adjacent first and second polarization modes;
   measuring one or more optical properties relating to at least one of the traveling waves, extracted from the cavity;
   deriving a bias error signal based on the optical properties thus measured, the bias error signal being responsive to changes in bias frequency, but substantially insensitive to rotation rate; and nulling the bias error signal.

2. The method of claim 1, wherein said step of generating comprises the substeps of:
   disposing in the cavity a saturable absorber having an absorption resonance whose frequency band is substantially coincident with that of the working resonance of the gain medium;
   establishing the oscillation of the first traveling wave on the first polarization mode; and
   tuning the cavity so that the mean frequency of the first polarization mode and the adjacent second polarization mode is substantially coincident with the center frequency of the absorption resonance, so as to establish the simultaneous oscillation of the second traveling wave differing in frequency from and contradirectional to the first traveling wave.

3. The method of claim 1, wherein the adjacent polarization modes are characterized by the same axial mode number.

4. The method of claim 1, wherein the adjacent polarization modes are characterized by axial mode numbers that differ by unity.

5. The invention of claim 1, wherein said step of nulling comprises the substeps of:
   providing an external reference frequency source; and
   adjusting the frequency of the reference frequency source.

6. The method of claim 5 wherein said steps of measuring and deriving together comprise:
   measuring the orientation and ellipticity of the polarization ellipse of one traveling wave, having been extracted from the cavity;
   determining a computational value of bias frequency by inserting the numerical values of orientation and ellipticity thus measured into prescribed bias computation formulae; and
   subtracting the bias frequency thus computed from the frequency of the external reference frequency source, the resulting frequency difference then representing the bias error signal.

7. The method of claim 1, wherein the optical properties measured are the orientation and ellipticity of the polarization ellipse of one traveling wave, having been extracted from the cavity.

8. The method of claim 7, wherein said step of deriving a bias error signal comprises the substeps of:
   disposing a reference frequency source outside the cavity, for bias subtraction, the frequency from said source being adjustable but equal at least approximately to the bias frequency;
   determining a computational value of bias frequency by inserting the numerical values of the optical properties thus measured into prescribed bias computation formulae; and
   subtracting the computed bias frequency from the frequency of the reference frequency source, the resulting frequency difference then representing the bias error signal.

9. The method of claim 8, wherein said step of nulling the bias error signal comprises adjusting the frequency of said external reference frequency source.

10. The method of claim 8, wherein said disposing step comprises disposing a Cartesian birefringence element and a rotator in the cavity.

11. The method of claim 1, wherein said step of nulling the bias error signal comprises adjusting the cavity birefringence.

12. The method of claim 11, wherein said steps of measuring and deriving together comprise:
   modulating the cavity birefringence, whereupon the polarizations of the two traveling waves are also modulated;
   measuring the modulated polarizations by directing one of the traveling waves extracted from the cavity to a polarization detector; and
   demodulating the electrical signal output of the polarization detector, to derive the bias error signal.

13. The method of claim 12, wherein the polarization detector comprises a polarizer and a photodetector.

14. The method of claim 12, wherein said disposing step comprises disposing two nominal halfwave plates, whose proper axes are misaligned, in the cavity.

15. The method of claim 14, wherein said step of modulating cavity birefringence comprises modulating certain linear combinations of the phase shifts of the half-wave plates.

16. The method of of claim 15, wherein:
   the linear combinations are the sum and difference of the phase shifts, the sum being modulated at a first modulation frequency and the difference being modulated at a second and different modulation frequency;

said demodulating step comprises demodulating the electrical signal at the first and second modulation frequencies to obtain first and second demodulation amplitudes that together comprise the bias error signal; and said adjusting step comprises adjusting the sum and difference of the phase shifts.

17. The method of claim 16, wherein said modulating step and said adjusting step comprise applying electric fields to the half-wave plates, whose phase shifts are thereby altered in accordance with the electro-optic properties of the half-wave plates.

18. The method of claim 16, wherein the said modulating step and said adjusting step comprise applying voltage signals to piezoelectric actuators attached to the half-wave plates, whose phase shifts are thereby altered in accordance with the photoelastic properties of the half-wave plates.

19. The method of claim 11, wherein said steps of measuring and deriving together comprise:

altering cavity birefringence during a series of discrete time intervals;

counting, during each time interval, the number of cycles of an electrical signal whose frequency is representative of the difference in frequency between the two traveling waves; and combining in a prescribed way the number of counts recorded for the different time intervals, to obtain a set of numbers that define the bias error signal.

20. The method of claim 19, wherein:

said step of altering cavity birefringence comprises one or more pulsed interrogation procedures, each procedure being characterized by a specific linear combination of the phase shifts of the plurality of birefringent elements and including two steps performed in sequence, where for each step the linear combination of phase shifts undergoes a change described by a pulse waveform that is non-zero only during a discrete time interval, the pulse waveform for the second step being the negative of that for the first step; and said combining step comprises taking the difference between the number of counts recorded for the two steps performed in sequence, there being one such difference number for each interrogation procedure, the set of such difference numbers then representing the bias error signal.

21. The method of claim 20, wherein:

the plurality of birefringent means comprises two nominal half-wave plates whose proper axes are misaligned;

there are two interrogation procedures, the first characterized by the sum and the second by the difference of the phase shifts of the two half-wave plates; and said adjusting step comprises adjusting the sum and difference of the phase shifts.

22. The method of claim 20, wherein the pulse waveform has a constant value during a discrete time interval, and is zero otherwise.

23. The method of claim 21, wherein the change in phase shifts associated with each step of a pulsed interrogation procedure and the adjusting of phase shifts are accomplished by applying electric fields to the half-wave plates.

24. The method of claim 21, wherein the change in phase shifts associated with each step of a pulsed interrogation procedure and the adjusting of phase shifts are accomplished by applying voltage signals to piezoelectric actuators attached to the half-wave plates.

25. A method of operating a ring laser whose structure includes an excited gain medium disposed in a ring cavity, and whose operational state is characterized in that only two traveling waves are generated, the waves being of different frequencies and propagating in opposite directions, the difference in frequency being responsive to rotation but representing a bias frequency for the ring laser at rest, comprising the steps of:

disposing a Cartesian birefringence element and a rotator in the cavity;

generating the two traveling waves on adjacent polarization modes;

detecting the difference in frequency between the said two traveling waves, extracted from the cavity, relative to the bias frequency, the difference in frequency being a measure of rotation;

measuring the orientation and ellipticity of the polarization ellipse representing the polarization state of one of the traveling waves, extracted from the cavity;

determining the difference between the frequency of an external reference frequency source disposed for bias subtraction and the bias frequency calculated from prescribed formulae having as independent variables the measured values of the orientation and ellipticity of the said polarization ellipse, the difference representing a bias error signal; and adjusting the frequency of the reference frequency source, to null the bias error signal.

26. A method of operating a ring laser whose structure includes an excited gain medium disposed in a ring cavity, and whose operational state is characterized in that only two traveling waves are generated, the two waves being of different frequencies and propagating in opposite directions, the difference in frequency being responsive to rotation but representing a bias frequency for the ring laser at rest, comprising the steps of:

disposing in the ring cavity two nominal halfwave plates whose proper axes are misaligned and whose phase shifts are adjustable;

generating the two traveling waves on adjacent polarization modes;

detecting the difference in frequency between the two traveling waves, extracted from the cavity, relative to the bias frequency, the difference in frequency being a measure of rotation;

altering in a prescribed way the sum and the difference of the phase shifts of the two half-wave plates;

measuring an optical property of at least one of the two traveling waves, extracted from the cavity, signifying the response of the ring laser to said altering step;

deriving a bias error signal based on the response of the ring laser to said altering step; and adjusting the sum and difference of the phase shifts, to null the bias error signal.

27. The method of claim 26, wherein said measuring step, said altering step, and said deriving step together comprise:

modulating the sum of the phase shifts at a first modulation frequency and modulating the difference of the phase shifts at a second and different modulation frequency;

directing one of the traveling waves, extracted from the cavity, to a polarization detector; and demodulating the electrical output signal of the polarization detector at the first and second modulation frequencies, to obtain respectively first and second demodulation amplitudes, which together represent the bias error signal.

28. The method of claim 26, wherein said measuring step, said altering step, and said deriving step together comprise:

applying two pulsed interrogations, individually and in sequence, one to the sum and one to the difference of the phase shifts, each interrogation comprising two steps performed in sequence, where for each step the phase shifts undergo a change described by a pulsed waveform that is non-zero only during a discrete time interval, the pulse waveform for the second step being the negative of that for the first step;

providing a difference frequency detector which generates a signal whose frequency is representative of the difference in frequency between the two traveling waves, extracted from the cavity;

counting the cycles of the said signal generated by the difference frequency detector during the discrete time interval, for each step of each of the two interrogations; and subtracting, for each interrogation, the number of counts recorded for the first step from the number recorded for the second step, to obtain two number differences that together represent the bias error signal.

29. A ring laser system for sensing rotation, comprising:

a ring cavity operative to support traveling wave modes of oscillation that propagate around a closed path;

a plurality of birefringent means, each disposed in said cavity, for rendering said cavity birefringent, whereupon certain cavity modes are polarization modes characterized by polarization and axial mode number;

means, disposed in said cavity, for establishing an operational state wherein only two traveling waves are generated, the two waves being generated on adjacent polarization modes with different frequencies and opposite propagation senses, the difference in frequency being responsive to rotation but representing a bias frequency for the ring laser at rest;

means for extracting portions of said first and second traveling waves from said cavity to define respective first and second beam components;

means for directing said first and second beam components along respective first and second external beam paths, wherein said first and second external beam paths include a common path segment over which said first and second beams are in substantial coincidence;

means, disposed in said common path segment, for determining the difference in frequency between said first and second beam components, relative to the said bias frequency;

means disposed in at least one of said first and second beam paths for measuring one or more optical properties relating to at least one of said two beam components;

means for deriving a bias error signal based on the optical properties thus measured; and means for nulling said bias error signal.

30. The ring laser system of claim 29, wherein said means for establishing comprises:

an excited gain medium disposed in said closed path;

a saturable absorber disposed in said closed path and having an absorption resonance whose frequency band is substantially coincident with that of the working resonance of the said gain medium; and tuning means for maintaining the mean frequency of said adjacent polarization modes at a value substantially equal to the center frequency of said absorption resonance.

31. The ring laser system of claim 30, wherein said gain medium comprises He-Ne, said absorber comprises excited neon, and said ring laser operates at wavelength of 0.63 microns.

32. The ring laser system of claim 30, wherein said gain medium comprises He-Ne, said absorber comprises methane, and said ring laser operates at wavelength of 3.4 microns.

33. The ring laser system of claim 30, wherein said tuning means comprises:

detector means for detecting the intensity of at least one of said two beam components; and servo means for adjusting cavity pathlength in response to the detected intensity, so that cavity pathlength is maintained at that value corresponding to a stationary point on the intensity-tuning curve.

34. The ring laser system of claim 29, wherein said means for determining the difference in frequency relative to said bias frequency comprises:

a photodetector, upon which the two coincident beams are incident;

an external reference frequency source that provides a signal whose frequency is substantially equal to the bias frequency;

frequency mixing means for combining the respective outputs of said photodetector and said reference frequency source to permit the frequency of said reference frequency source to be subtracted from the frequency of the electrical signal output of said photodetector; and frequency counting means for counting the number of cycles of the signal that is the output of said mixing means.

35. The ring laser system of claim 34, additionally comprising a polarizer through which the two coincident beams are transmitted prior to incidence on said photodetector.

36. The ring laser system of claim 34, wherein said means for measuring comprises polarization detection means, disposed in one beam path, for measuring the orientation and ellipticity of the polarization ellipse of the corresponding beam component.

37. The ring laser system of claim 36, wherein said polarization detection means comprises a polarimeter.

38. The ring laser system of claim 36, wherein said means for deriving a bias error signal comprises computational means for computing bias frequency on the basis of the measured values of said orientation and ellipticity, and for computing the difference between the computed bias frequency and the frequency of the said external reference frequency source, said difference then representing the bias error signal.

39. The ring laser system of claim 34 or 38 wherein:

the frequency of said external reference frequency source is adjustable; and said means for nulling comprises servo means for adjusting the frequency of said external reference frequency source, in response to a bias error signal.

40. The ring laser system of claim 29 or 39, wherein said plurality of birefringent means comprises Cartesian birefringence means and a rotator.

41. The ring laser system of claim 40, wherein said Cartesian birefringence means comprises a waveplate.

42. The ring laser system of claim 40, wherein said Cartesian birefringence means comprises one or more cavity reflectors for which the phase shift upon reflection is different for polarization components parallel and normal to the plane of reflection.

43. The ring laser system of claim 40, wherein said rotator comprises a natural rotator.

44. The ring laser system of claim 40, wherein said rotator comprises a Faraday rotator.

45. The ring laser system of claim 29, wherein said plurality of birefringent means comprises two nominal half-wave plates whose proper axes are misaligned.

46. The ring laser system of claim 45, wherein said means for measuring and said means for deriving a bias error signal together comprise:
   means for modulating the sum of the phase shifts of the two half-wave plates at a first modulation frequency, and for modulating the difference of said phase shifts at a second and different modulation frequency;
   polarization detection means for providing an output signal representative of the polarization of one of the external beam components; and
   demodulation means for demodulating the output signal of said polarization detection means at said first and second modulation frequencies so as to produce first and second demodulation amplitudes that together represent the bias error signal.

47. The ring laser system of claim 46, wnerein said polarization detection means comprises a polarizer and a photodetector.

48. The ring laser system of claim 46, wherein said demodulation means comprises synchronous detection means.

49. The ring laser system of claim 46, wherein said means for nulling comprises servo means for adjusting the sum and the difference of said phase shifts in response to a bias error signal.

50. The ring laser system of claim 49, wherein said means for modulating comprises, and said servo means additionally comprises, voltage means for applying electric fields to said half-wave plates to alter said sum and difference of phase shifts.

51. The ring laser system of claim 49, wherein said means for modulating comprises, and said servo means additionally comprises:
   piezoelectric actuators attached to said half-wave plates; and
   voltage means for applying signals to said piezoelectric actuators to alter said sum and difference of phase shifts.

52. The ring laser system of claim 29, wherein said means for measuring and said means for deriving a bias error signal together comprise:
   perturbation means for altering specific linear combinations of the phase shifts of said plurality of birefringent means, the change in each phase shift describing a pulse waveform that is non-zero during a discrete time interval;
   means for obtaining a signal representative of the difference in frequency between the two beam components;
   means for counting the cycles of said signal during said discrete time interval; and
   means for combining the number of counts thus recorded for a prescribed sequence of pulses, each pulse being characterized by a specific linear combination of phase shifts and by the magnitude and sign of the pulse waveform, the set of numbers resulting from such combining representing the bias error signal.

53. The ring laser system of claim 52, wherein said means for obtaining a signal representative of the difference in frequency comprises a photodetector that receives at least a portion of the said first and second beam components from said common path segment where said beams are in substantial coincidence.

54. The ring laser system of claim 53, additionally comprising a polarizer through which said beams are transmitted prior to incidence on said photodetector.

55. The ring laser system of claim 53, wherein said signal is the output signal of said photodetector.

56. The ring laser system of claim 53, additionally comprising frequency mixing means, the input to which comprises two signals, of which one is the output signal of said photodetector, and wherein said signal representative of the difference in frequency is the output of said frequency mixing means.

57. The ring laser system of claim 52, wherein said means for nulling comprises servo means for altering said specific linear combinations of phase shifts in response to a bias error signal.

58. The ring laser system of claim 57, wherein:
   said plurality of birefringent means comprises two nominal half-wave plates whose proper axes are misaligned;
   said specific linear combinations are firstly the sum and secondly the difference of the phase shifts of the two half-wave plates;
   said means for combining comprises subtraction means for obtaining the difference between the number of cycles of said signal counted for a first pulse waveform and the number counted for a second pulse waveform; and
   said set of numbers representing the bias error signal comprises two numbers, the first being said number difference when the specific linear combination is the sum and the second being said number difference when the specific linear combination is the difference, said first and second pulse waveforms being identical except that one is the negative of the other.

59. The ring laser system of claim 58, wherein said first and second pulse waveforms are constant during said discrete time intervals, and zero otherwise.

60. The ring laser system of claim 57 or 58, wherein said perturbation and said servo means for altering comprise voltage means for applying electric fields to said two half-wave plates.

61. The ring laser system of claim 57 or 58, wherein said perturbation and servo means for altering comprise:
   piezoelectric actuators and attached to said two half-wave plates; and
   voltage means for applying signals to said piezoelectric actuators.

62. A ring laser system comprising:

a ring cavity defined by three or more reflector means, at least one of which is partially transmitting, and made birefringent by internally disposed waveplate and rotator;

an excited gain medium disposed in said ring cavity to support the simultaneous oscillations of two traveling waves of different frequency and contrary propagation sense that are generated on adjacent polarization modes;

means for suppressing all traveling-wave oscillations other than the aforementioned two traveling waves;

frequency detection means for generating a signal at a frequency representative of the difference in frequency between said two traveling waves, extracted from the cavity;

polarization detection means for determining the orientation and ellipticity of the polarization ellipse representing the polarization state of at least one of said two traveling waves, extracted from the cavity;

an external reference frequency source providing a signal whose frequency is adjustable;

means for converting the measured orientation and ellipticity into a computed value of bias frequency, said value representing the difference in frequency for the ring laser at rest;

subtraction means for obtaining the difference between the computed bias frequency and the frequency of the said reference frequency source, which difference represents the bias error;

means for adjusting the frequency of said reference frequency source, to null said bias error.

63. The ring laser system of claim 62, wherein said means for suppressing comprises a saturable absorber disposed in said ring cavity and having an absorption resonance whose frequency band is substantially coincident with that of the working resonance of said gain medium.

64. A ring laser system comprising:
a ring cavity defined by three or more reflector means, at least one of which is partially transmitting, and made birefringent by two misaligned nominal half-wave plates disposed in the ring cavity, the phase shifts of said two half-wave plates being adjustable about their nominal values;

an excited gain medium disposed in said ring cavity to support the simultaneous oscillations of two traveling waves of different frequency and contrary propagation sense that are generated on adjacent polarization modes, the difference in frequency for the ring laser at rest representing a bias frequency;

means for suppressing all traveling wave oscillations other than the aforementioned two traveling waves;

means for modulating the sum and the difference of the phase shifts of said two half-wave plates at first and second modulation frequencies;

a polarizer through which is transmitted a portion of one of said two traveling waves, extracted from the cavity;

a photodetector upon which the beam transmitted through said polarizer is incident, the photodetector output being an electrical signal having frequency components at said two modulation frequencies;

means for demodulating said electrical signal at said two modulation frequencies, to produce two demodulation amplitudes that together represent a bias error signal; and servo means for adjusting the sum and difference of said phase shifts in response to said bias error signal, which is thereby nulled.

65. The ring laser system of claim 64, wherein said means for suppressing comprises a saturable absorber disposed in said ring cavity and having an absorption resonance whose frequency band is substantially coincident with that of the working resonance of the said gain medium.

66. A ring laser system comprising:
a ring cavity defined by three or more reflector means, at least one which is partially transmitting, and made birefringent by two misaligned nominal half-wave plates disposed in the ring cavity, the phase shifts of the two half-wave plates being adjustable about their nominal values;

an excited gain medium disposed in said ring cavity to support the simultaneous oscillations of two traveling waves of different frequency and contrary propagation sense that are generated on adjacent polarization modes, the difference in frequency for the ring laser at rest representing a bias frequency;

means for suppressing all traveling wave oscillations other than the aforementioned two traveling waves;

means for independently altering the sum and the difference of the phase shifts of said two half-wave plates, said altering being described by a pulse waveform that is non-zero only during a discrete time interval;

means for obtaining a signal representative of the difference in frequency between said two traveling waves;

means for counting the cycles of the said signal during said discrete time interval;

means for deriving first and second number differences, each number difference being the difference between the number of cycles of said signal counted during the discrete time interval of a first pulse waveform and the number counted during the discrete time interval of a second pulse waveform, the first and second pulse waveforms being identical except that one is the negative of the other, the sum of said phase shifts being altered to obtain the first number difference, and the difference of said phase shifts being altered to obtain the second number difference; and servo means, for altering the sum and difference of said phase shifts in response, respectively, to said first and second number differences, which are thereby nulled.

67. The ring laser system of claim 66, wherein said means for suppressing comprises a saturable absorber disposed in said ring cavity and having an absorption resonance whose frequency band is substantially coincident with that of the working resonance of said gain medium.

68. The ring laser system of claim 66, wherein said means for obtaining a signal comprises:
beam combining optics, whereby portions of the two traveling waves that have been extracted from the cavity are brought together to form substantially parallel and substantially coincident beams;

a polarizer, through which said beams are transmitted; and a photodetector, upon which said beams are incident after transmission through said polarizer.

* * * * *